United States Patent
McIntyre et al.

(10) Patent No.: US 6,351,321 B1
(45) Date of Patent: Feb. 26, 2002

(54) DATA SCANNING AND CONVERSION SYSTEM FOR PHOTOGRAPHIC IMAGE REPRODUCTION

(75) Inventors: Dale Frederick McIntyre, Honeoye Falls; Joseph Anthony Manico, Rochester, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/076,533

(22) Filed: May 12, 1998

Related U.S. Application Data

(62) Division of application No. 08/937,388, filed on Sep. 25, 1997, now abandoned, which is a continuation of application No. 08/388,647, filed on Feb. 14, 1995, now abandoned.

(51) Int. Cl.$^7$ ................................................. H04M 1/40
(52) U.S. Cl. ..................................... 358/450; 358/1.11
(58) Field of Search ............................... 358/450, 453, 358/1.11, 470; 396/292

(56) References Cited

U.S. PATENT DOCUMENTS

| | | | | |
|---|---|---|---|---|
| 3,772,465 A | | 11/1973 | Vlahos et al. ............ 178/5.2 D |
| 4,089,018 A | * | 5/1978 | Asano ......................... 354/106 |
| 4,344,682 A | | 8/1982 | Hattori ......................... 354/62 |
| 4,516,155 A | | 5/1985 | Hennig et al. ................. 358/80 |
| 4,558,374 A | | 12/1985 | Kurata et al. ................ 358/287 |
| 4,659,213 A | | 4/1987 | Matsumoto .................... 355/38 |
| 4,760,463 A | * | 7/1988 | Nonoyama et al. .......... 358/280 |
| 4,823,163 A | | 4/1989 | Rollet et al. ................... 355/41 |
| 4,858,003 A | | 8/1989 | Wirt et al. ................... 358/102 |
| 4,872,062 A | | 10/1989 | Nanba ......................... 358/443 |
| 4,881,132 A | * | 11/1989 | Lajos ........................... 358/296 |
| 4,942,427 A | | 7/1990 | Rakov et al. ................. 355/202 |
| 4,979,032 A | * | 12/1990 | Alessi et al. ................... 358/76 |
| 5,038,379 A | * | 8/1991 | Sano ............................... 382/1 |
| 5,075,787 A | * | 12/1991 | Shaughnessy et al. ....... 358/452 |
| 5,128,702 A | | 7/1992 | Ogawa et al. ............... 354/106 |
| 5,138,366 A | * | 8/1992 | Maronian ...................... 355/32 |
| 5,138,465 A | * | 8/1992 | Ng et al. ...................... 358/153 |
| 5,150,429 A | | 9/1992 | Miller et al. ................... 382/50 |
| 5,159,444 A | * | 10/1992 | Shimizu ......................... 358/76 |
| 5,181,255 A | | 1/1993 | Bloomberg ...................... 382/9 |

(List continued on next page.)

Primary Examiner—Thomas D. Lee
Assistant Examiner—Stephen Brinich
(74) Attorney, Agent, or Firm—Francis H. Boos, Jr.; Ronald R. Schlindler, II

(57) ABSTRACT

A system for scanning film image frames containing both an image and recorded information optically imprinted on the image by a camera and reproducing the image with enhanced text reproduction. In print or Photo CD image reproductions, the text appears outside the reproduced image or is enhanced within the reproduced image for better readability. Recorded information is detected in the lateral and longitudinal stripe regions of the film image frame where such information is typically exposed by a camera having the capability is analyzed for its characteristic color hue and pattern. When present, the recorded characters or code patterns are recognized or decoded into ASCII code and formatted for printing or writing to Photo CD to appear as enhanced font text. In a full frame operating mode, an ID code of the data bits corresponding to the characters or code is generated for use in a re-touching algorithm to fill in the data bits so that the full image frame may be printed or recorded to Photo CD. In other variations, the characters may be enhanced to appear in the reproduced image. In a cropped frame operating mode, the data sub-set containing the recorded information may be discarded and only a cropped image reproduced with the text. In all cases, certain of the recorded information may be recognized as exposure data written by the camera that is employed to classify and color correct the reproduced image and may or may not be reproduced as text.

42 Claims, 9 Drawing Sheets

U.S. PATENT DOCUMENTS

| | | | |
|---|---|---|---|
| 5,182,590 A | * 1/1993 | Kaihara et al. | 354/106 |
| 5,198,907 A | 3/1993 | Walker et al. | 358/296 |
| 5,199,084 A | 3/1993 | Kishi et al. | 382/48 |
| 5,214,470 A | 5/1993 | Denber | 355/75 |
| 5,237,156 A | 8/1993 | Konishi et al. | 235/375 |
| 5,300,381 A | * 4/1994 | Buhr et al. | 430/30 |
| 5,302,990 A | * 4/1994 | Satoh et al. | 354/106 |

* cited by examiner

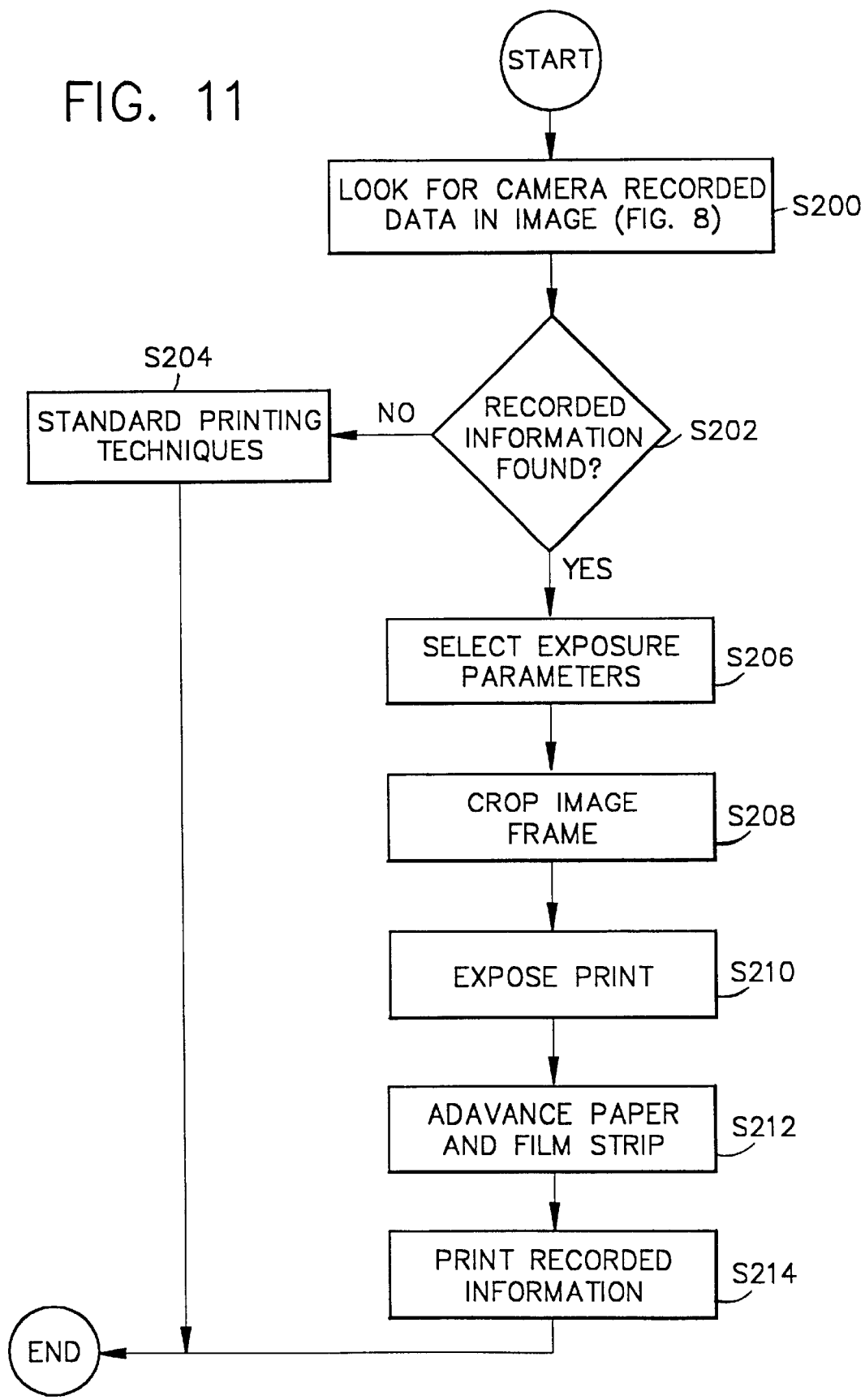

DATA SCANNING AND CONVERSION SYSTEM FOR PHOTOGRAPHIC IMAGE REPRODUCTION

CROSS-REFERENCE TO RELATED APPLICATIONS

This is a divisional of application Ser. No. 08/937,388, filed Sep. 25, 1997 now abandonded which is a continuation of Ser. No. 08/388,647, filed Feb. 14, 1995 now abandoned.

FIELD OF THE INVENTION

The present invention is related to photography and more particularly to a system for scanning film image frames containing both an image and information exposed in the image frame by a camera, identifying the recorded information, and reproducing the images and recorded information in print or Photo CD reproductions.

BACKGROUND OF THE INVENTION

A number of current photographic cameras are provided with a "dateback" feature whereby the date and time of exposure of a filmstrip image frame can also be exposed on the negative (or transparency) inside the image frame. The technique employed in the camera typically involves energizing a linear array of red LEDs positioned in the filmstrip transport path just inside the image frame border. The LED array is energized in response to write signals provided from the camera microcontroller during advancement of the exposed image frame past the linear array. The LED on/off states are controlled by the write signals during the filmstrip advancement to expose red (typically) alphanumeric characters on the negative image frame. The alphanumeric numeric characters are subsequently exposed on the photographic paper at the time that prints are made from the negative image frames and typically appear in red on the prints, masking the background print image where they appear.

More recently, photographic images are printed from the film image to a compact disc for video display in the "Photo CD" system introduced by Eastman Kodak Co. The alphanumeric characters exposed in the film image are detected and stored with the image for video display together.

In more expensive SLR camera systems with replaceable camera backs, data backs can be added that provide a complete alphanumeric keypad entry for use by the photographer to enter more extensive notes that may be related to the person or event photographed. For example, in U.S. Pat. No. 4,344,682, a camera is described for recording information related to each image frame as small alphanumeric characters exposed in a corner portion of the image frame for photographic reproduction on the print made from the negative image frame. The information may be stored in temporary memory prior to making the exposures of the image frames and exposed on the image frames in conjunction with the image frame exposure. As each message is inputted into memory, it is displayed and may be edited. The input mechanism depicted is a keyboard. The imprinting of these annotations on the negative image frame, and the subsequent appearance of the annotation on the print in the image area is quite similar.

Typically, the camera manufacturer designs the system to write the information along the long edge of the negative as shown in FIG. 1 at the bottom of the scene when the camera is held in the normal way during exposure. In U.S. Pat. No. 5,128,702, a method is disclosed which attempts to manipulate the orientation of the data written into the negative image frame to the orientation of the camera. In this process, the horizontal or vertical orientation of the camera is detected, and the characters are exposed in dot-matrix font in the proper orientation to the resulting film image. Regardless of where or exactly what information is exposed on the negative image frame, the consumer ends up with a print with characters exposed on it.

It has also been proposed to provide the camera with a data recording function to record information related to the exposure conditions and camera settings of the image captured in the scene or "exposure data". Such exposure data is of particular use in providing the proper classification of the captured image for reproducing it either by digital reproduction systems or by color printers. For example, the fact that the camera flash unit was employed can be recorded for read out and use by the automatic color printer to set the color balance and print paper exposure conditions. Similarly, such exposure data may be used to affect the color balance in processing trichromatic image frame data sets scanned from the illuminated image frame for reproduction of the image in a video display or digital print or for creation of a Photo CD.

Systems have also been proposed to magnetically record the exposure data as well as the date and time and photographer entered information as recorded information in tracks on a magnetics-on-film layer inside and/or outside the film image frame or to optically expose such information in tracks located outside the film image frame. For optical recording of such information, the film edge strip outside the image frame where it could take place is limited, particularly since that same area is typically occupied by pre-exposed film manufacturing data, frame numbers and intermittently placed sprocket holes.

PROBLEMS TO BE SOLVED BY THE INVENTION

In one aspect of the invention, the problem addressed relates to accommodating the optical recording of such recorded information within the image frame to the extent necessary to record all the information without unnecessarily compromising the captured image.

While the reproduction of such recorded information (including the exposure data in some instances) is desirable, the reproduction within the print or video image distracts from the pleasing aesthetic aspects of the scene or persons. Often is appears right on and obliterating the subject of interest. When the photographer chooses to fill the image frame with the subject or places the subject off center for artistic, compositional purposes, the red characters may completely ruin the intentions of the photographer. Moreover, even in cases where this information is desirable in the resulting print or video image, it sometimes can be barely legible if the monochromatic characters are imposed on a busy background and/or a similar color background. This problem occurs with both print image and Photo CD video display reproductions.

SUMMARY OF THE INVENTION

It is therefore an object of the present invention to provide an automatic system for recognizing and decoding recorded information, e.g. alphanumeric characters or encoded data, of a message exposed in a film image frame and for reproducing at least a portion of the recorded information in a fashion that renders it more readable and enhances the print or video image reproduced from the film image.

It is a further object of the present invention to provide an automatic system for recognizing and decoding such recorded information and for making a reproduction of the image without the recorded information in it.

It is a yet a further object of the present invention to restore or fill the portions of the film image frame obliterated by such recorded information and to reprint or display the recorded information outside the print or video image on a border or on the back of a print reproduction made of the restored image.

It is still a further object of the present invention to alter the film image frame format and the recorded information to enhance and/or change the printed or video display reproduction thereof within or outside the reproduced print or video display image.

It is a specific object of the present invention to make a full print image or create Photo CD image frame from a film image frame having recorded dateback information or other information entered by the camera or the user and exposed therein by a camera, wherein the exposed dateback area is filled in with surrounding image pixels in the resulting prints, and the dateback information is reprinted or displayed outside the print or video image area on a border or on the back side of a print image.

Finally, it is a still further object of the invention to recognize and employ recorded information automatically recorded by the camera related to the exposure of a film image frame to control the operation of the reproduction apparatus in reproducing the image while selectively removing such recorded information from the reproduced image.

Accordingly, to solve the need for data information associated with an individual photograph for use in either reproducing the captured image or for the photographer's purposes and the annoying reproduction of the information in the image field, the invention proposes that the negative (or positive) capture media, i.e., the film image, be scanned by a linear CCD array, or preferably an area CCD array, to develop a full frame color and luminance scan image data set. The scan image data set is then analyzed by a search algorithm concentrating on the edge region(s) of the image frame area where such recorded information usually appears to locate the sub-set of character image data for such recorded information, if present. The search algorithm is tailored to first recognize the characteristic red or other wavelength color bandwidths typically employed to expose the time and date or other recorded information, including encoded information. Once a region image data sub-set is identified by such color analysis as having characters or encoded information therein, it is separated from the scan image data set, subjected to optical character or code recognition, and the recognized information therein is converted to ASCII code for temporary storage. For purposes of simplicity, the term "character image data sub-set" is used herein to refer to such a sub-set of the lateral or longitudinal edge regions of a film image frame where such recorded information is sought to be located, if present, in both cases where the recorded information is in a dot or bar code encoded pattern or in the form of alpha-numeric characters.

In the first, full frame embodiment of the invention, a character or code bit-map (hereafter, "character information" in either case) of the recorded information within the image data sub-set is generated. The character bit-map is thereby identified and "lifted" from the character image data sub-set, in a sense leaving a void in the character image data sub-set. In the first preferred embodiment, the void is filled as the character image data sub-set is subjected to a re-touching algorithm of any of the types well known in the art to create a re-touch image data sub-set of data bits that is substituted therefore in a re-constituted or composite image data set. The re-touch image data sub-set duplicates the data bits adjacent to the character bit-map data bits to thereby fill in the data void.

After the scanning and re-touching operations, the composite image data set is employed to reproduce the image as a Photo CD or print image reproduction devoid of the lifted recorded information. The ASCII code of the character image data sub-set is used to reproduce the lifted recorded information outside the reproduction area of the print or video image.

Moreover, to the extent that the recorded information is recognized to constitute exposure data for use in classifying the captured image or otherwise processing the scan image data set for color balance or the like, such exposure data is provided to process the scan image data set before it is provided to the printer or other reproduction apparatus. In addition, such recorded information may or may not be reproduced outside the reproduction area of the print or video image.

In a first full frame variation, the re-touching algorithm is not employed. Instead, the recorded information is digitally overprinted in the same character bit-map area but with a high quality font in a more pleasing color and graphics that would be clearly legible. In this case, it would be difficult to distinguish the recorded date information and other text information entered by the photographer from that automatically entered by the camera, and in the simplest case, all such information would be printed in enhanced font.

In a further cropped image embodiment, once characters or encoded data are recognized in a character image data sub-set, the ASCII code is retained, but the character image data sub-set is discarded for purposes of forming the reproduction image. The remaining image data set is employed to form the cropped video or print image, and the recorded information is reproduced outside the image area as described above.

In a further simplification of the cropped image embodiment for implementation in optical printers, the cropped image is optically printed from the portion of the film image that does not contain the recorded information, and the text is reproduced outside the print or video image area as described above. In this embodiment, the exposure data automatically recorded by the camera may be separately employed to control the operation of the automatic printer.

ADVANTAGES OF THE INVENTION

The invention advantageously results in the restoration of the photographed image or scene in prints or reproductions made of the image frame while preserving the information for printing as an annotation associated with the print or video image, thereby attaining a more aesthetically pleasing reproduction.

The invention further facilitates the expansion of the amount and types of information stored in the image frame using inexpensive and conventional techniques already implemented in camera technology.

The present invention in the embodiments, operating modes and variations described above has particular application to Photo CD technology. With the advent of the Kodak Photo CD system, the scanning of the image is already taking place. If the consumer's choice of output is Photo CD, the processed scan image data) could be written to the Photo CD disk with the ASCII text as a separate field.

The text can then be displayed in an area of the TV screen that is usually blackened and thus not compromising the enjoyment of the original composition.

The print image reproduction may be accomplished with a digital image processor e.g. a video image printer for exposing photographic print paper or by a digital print engine, e.g. a thermal dye transfer printer or a laser color printer. The reproduction of recorded information is available in any font type/size/color to create a more pleasing result.

Moreover, the operation of the conventional optical printer can be improved in both its exposure control of the cropped image as well as the printing of the text in relation to the print.

BRIEF DESCRIPTION OF THE DRAWINGS

These and other objects, advantages and features of the invention will be become apparent from the detailed description given hereinafter in relation to the accompanying drawings, in which:

FIG. 11 is a flowchart illustrating the overall operation of the system of FIG. 10 in the second operating mode.

DETAILED DESCRIPTION OF THE PREFERRED EMBODIMENTS OF THE INVENTION

Figure 1:
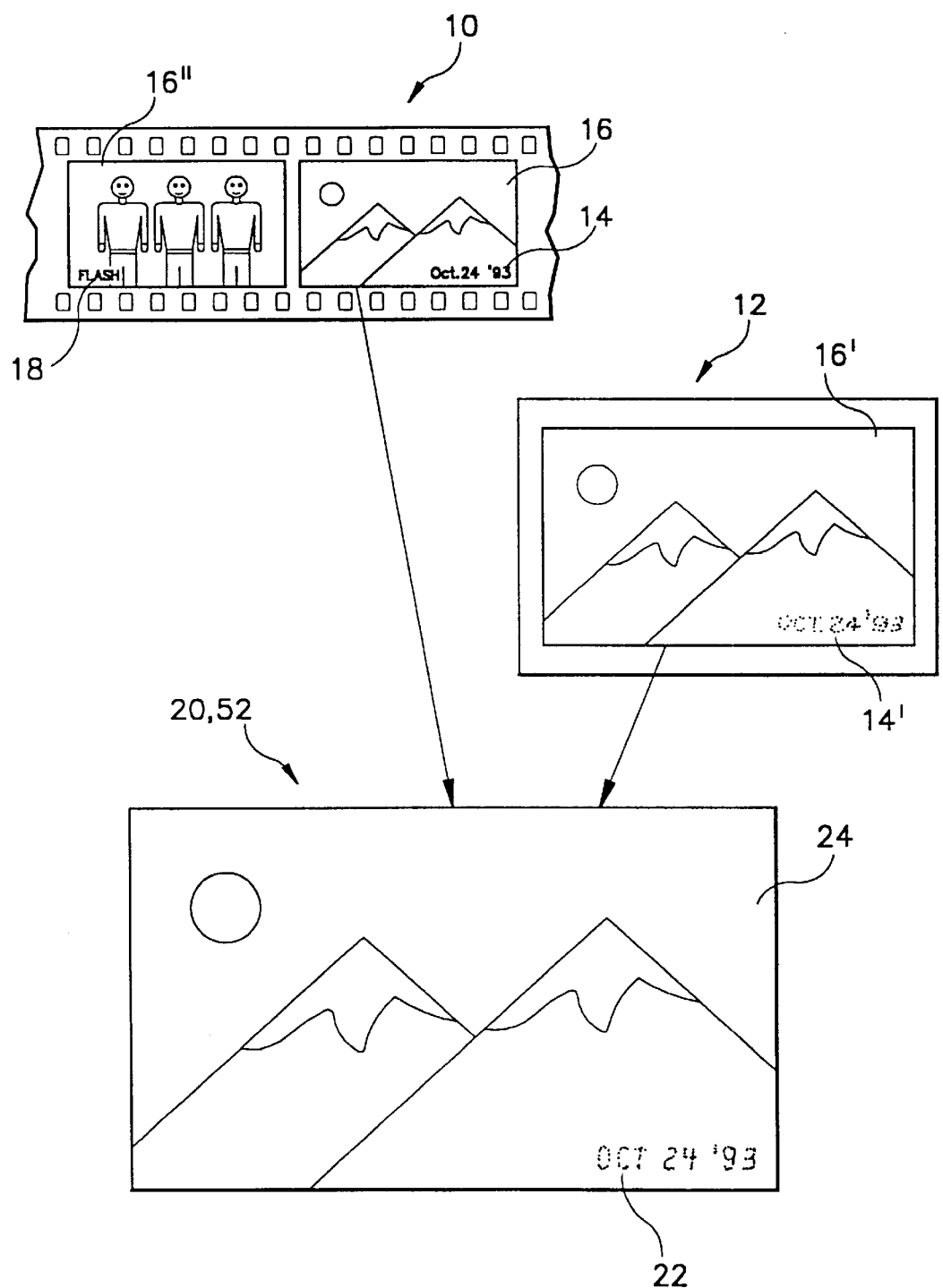
FIG. 1 depicts a prior art negative filmstrip and slide mounted transparency with recorded information appearing in the film image frames thereof and an enlarged print made from the image frame.

Turning first to FIG. 1, it illustrates a negative filmstrip 10 or transparency 12 with recorded information 14, 14' appearing in the film image frames 16, 16' thereof and an enlarged print 20 (or video image frame from a Photo CD playback) made from the film image therein bearing the optically enlarged, printed characters of text 22 superimposed on the print or video image 24. A further image frame 16" is also depicted in the negative filmstrip 10 which represents a departure from the prior art and is described further below.

As described above with reference to the '682 and '702 patents, the recorded information 14, 14' in image frames 16 and 16' is exposed as alphanumeric characters of a red hue in the image frames 16, 16' by a camera mounted LED array. Typically, the characters are formed in a dot matrix font that becomes rougher in appearance as the image is magnified. As shown in FIG. 1, the optically printed or recreated characters of the printed or video displayed text 22 obscure a part of the print or video image 24.

The recorded information may include the types of information described above that are input either by the camera or the photographer. In the prior art, the camera generated time and date and the user input annotations can appear as recorded information text 14, 14'. In accordance with one aspect of the present invention, certain of the recorded information may constitute the above-described, camera recorded, exposure data which can include an indication as to the lens settings, the camera type and the use of artificial illumination. Other film related data, relating to film type, manufacturer, film speed, and the like, would already be exposed on the film strip and readable by the film scanner, in the case of a negative film strip, employing conventional read out techniques, to provide data for color correcting and balancing the scan image data for digital printing or the setting of lamphouse illumination parameters for optical printing. In accordance with the present invention, the combined pre-recorded film characteristic data and camera exposed exposure data can both be employed in interpreting the color correction and balance to be applied to the scan image data set as described below.

Such a camera recorded exposure data inscription is indicated by the "FLASH" word 18 appearing in image frame 15 in FIG. 1, indicating that artificial illumination was used for that exposure. In accordance with current digital and optical printing techniques, the word FLASH would appear on the resulting print or video image. It would be desirable first to decode and employ the word to adjust the reproduction parameters employed in digital and optical printing.

One reason for this is that the scanning of image frames to classify the image by either large area transmission density (LATD) or discrete area densities does not always discriminate the type of lighting of the scene that is captured in the film image. Algorithms that are employed in automatic printers to make a best estimate of the scene lighting conditions frequently are fooled by the illumination of the objects in the scene, resulting in over or under exposed prints of poor color balance that have to be reprinted with operator input. It would be of significant benefit to the simplification and accuracy of the automatic classification algorithm if the scene lighting conditions are known.

Turning to a further departure from the prior art, the recorded information 14, 14' may also take the form of a code pattern e.g., a dot code or bar code, optically exposed by an array of LEDs of the type shown in the above-referenced '682 and '702 patents in the same region of the film images 15 and 16, 16'. For example, the dot code pattern can be programmed into the camera of the type shown in the '682 and '702 patents to expose short hand symbols for the exposure data words and date numbers, rather than spell out the full word 18 or date text 22 of FIG. 1, for example. Such a high information content code pattern would therefore also be exposed in stripe regions of the film image frame extending within an edge region thereof, typically at the bottom of the captured image with the camera held in either the vertical or horizontal orientation. An example of the recording of such encoded information is described below with reference to FIG. 6. The following description of the invention will be understood to be applicable to recorded information, including exposure data, comprising either alpha-numeric character or code pattern, or both, either for reproduction or for use in processing the scan image data set.

This expansion of the type and format of recorded information exposed optically in the image frame to include exposure data and/or annotations made by the photographer is facilitated by the premise that it would not appear in the reproduction of the image in accordance with certain of the following reproduction modes contemplated by the invention.

Figure 2:
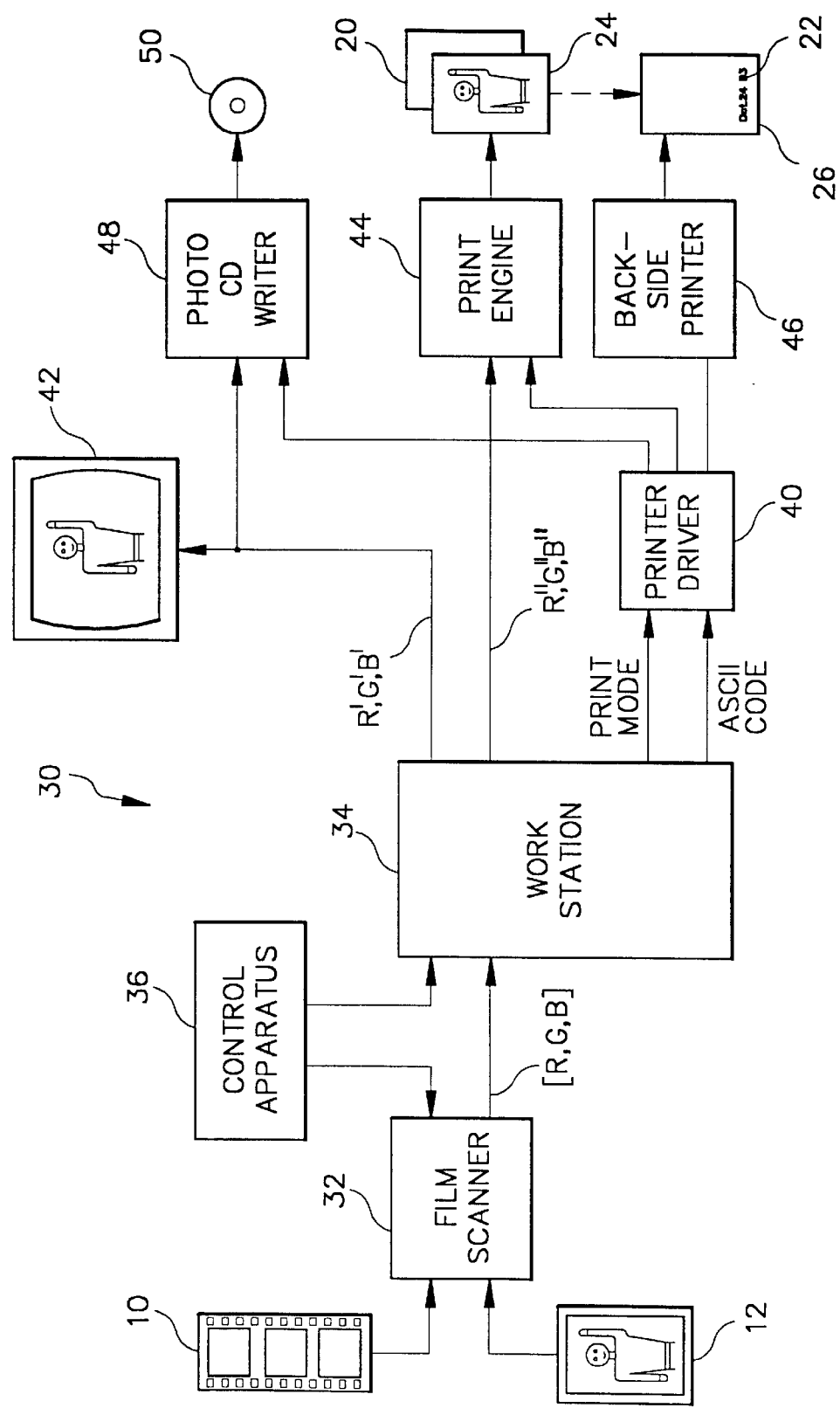
FIG. 2 is an illustration of a system for scanning and digitizing the film image frame of FIG. 1 into scan image data, processing the scan image data and making a reproduction of the image and the recorded information as a print image or Photo CD disk a variety of operating modes and formats in accordance with various embodiments of the invention.

Turning to FIG. 2, it illustrates a digital image reproduction system 30 for scanning and digitizing the film images in the frames 16 and 16' of the filmstrip 10 and transparency 12 into scan image data, processing the scan image data and making a reproduction of the film image and the recorded information in a variety of ways in accordance with the various embodiments and aspects of the invention. The system 30 includes a film scanner 32, of any of the well known types that typically illuminate the image frames 16, 16' with filtered light and direct the transmitted light on to a CCD imager that develops full frame scan image data sets [R, G, B] of line scan image data in red, green and blue. The CCD imager used in the film scanner 32 may be either a linear CCD array for line scanning the film image as it is transported past the array or an area CCD array imager for line scanning a stationary film image. In either case, three CCD optically parallel arrays may be color filtered to derive the [R, G, B] scan image data. Such a linear CCD array film scanner 32 for both slides and negative filmstrips is described in commonly assigned co-pending U.S. patent application Ser. No. '08/201,282 filed Feb. 16, 1994 and entitled "Film Scanner With In-Line Dual Scanning Gates", and cross-referenced applications disclosed therein. An area CCD array film scanner 32 is disclosed in commonly assigned U.S. Pat. No. 4,858,003 entitled "Mechanism for Handling Slides and Film Strips", incorporated herein by reference.

Such film scanners are typically used in conjunction with Photo CD conversion systems to convert still frame images into CD format to create a Photo CD for video reproduction. Telecine film scanners are also well known for converting movie film frames into video tape, CD or direct transmission formats for video display of the movies.

The present invention as depicted in the first embodiment of FIG. 2 has particular application to either making prints 20 or creating Photo CD disks 50 of image frames 16, 16' containing the recorded information 14, 14' in a variety of embodiments and variations described below depending on the print image format and location of the display or printing of the recorded information. The following discussion of FIG. 2 includes a description of components and operating modes that may be selectively employed in the alternate format and processing variations resulting in the print images or video screen displays both referenced as print 20 or Photo CD 50 as depicted in FIGS. 2–6.

In the system 30 of FIG. 2, the red, green, and blue scan image data set [R, G, B] for each film image frame 16, 16' derived by film scanner 32 is applied to a work station 34. The work station 34 and the film scanner 32 are connected to control apparatus 36 that an operator can access to control operations of the system 30. The work station 34 may be a Sun Sparc station or a MacIntosh Power PC, and the control apparatus may simply be a keyboard for entering instructions. Work station 34 develops a composite, color corrected, video display image data set [R', G', B'] and printer image data set [R", G", B"] as well as at least one character image data sub-set $[R, G, B]_s$ employing color correction algorithms that take into account the type of scene captured and the exposure conditions.

Figure 7:
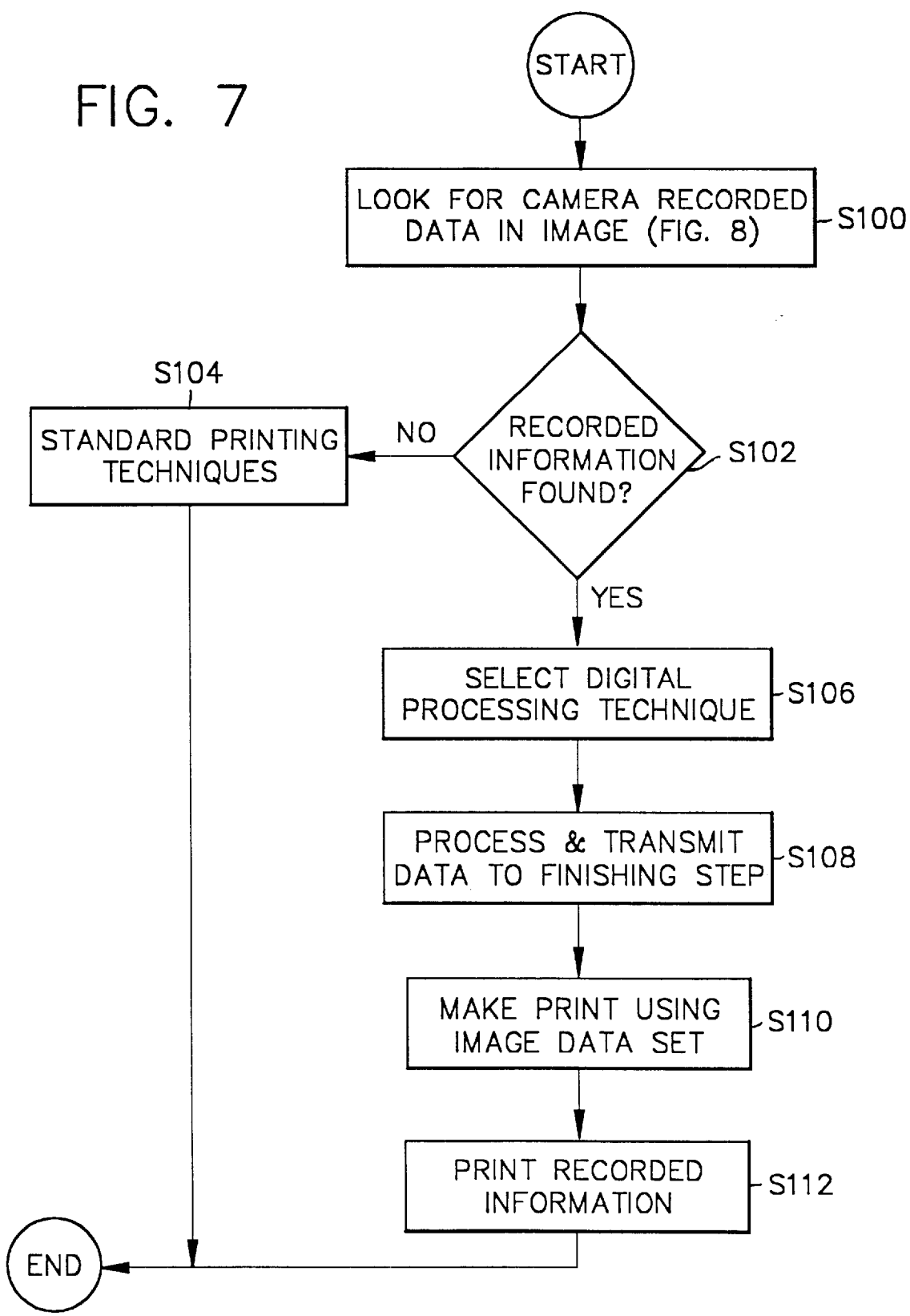
FIG. 7 is a flowchart illustrating the overall operation of the system of FIG. 2 in either the first or second operating modes.
Figure 8:
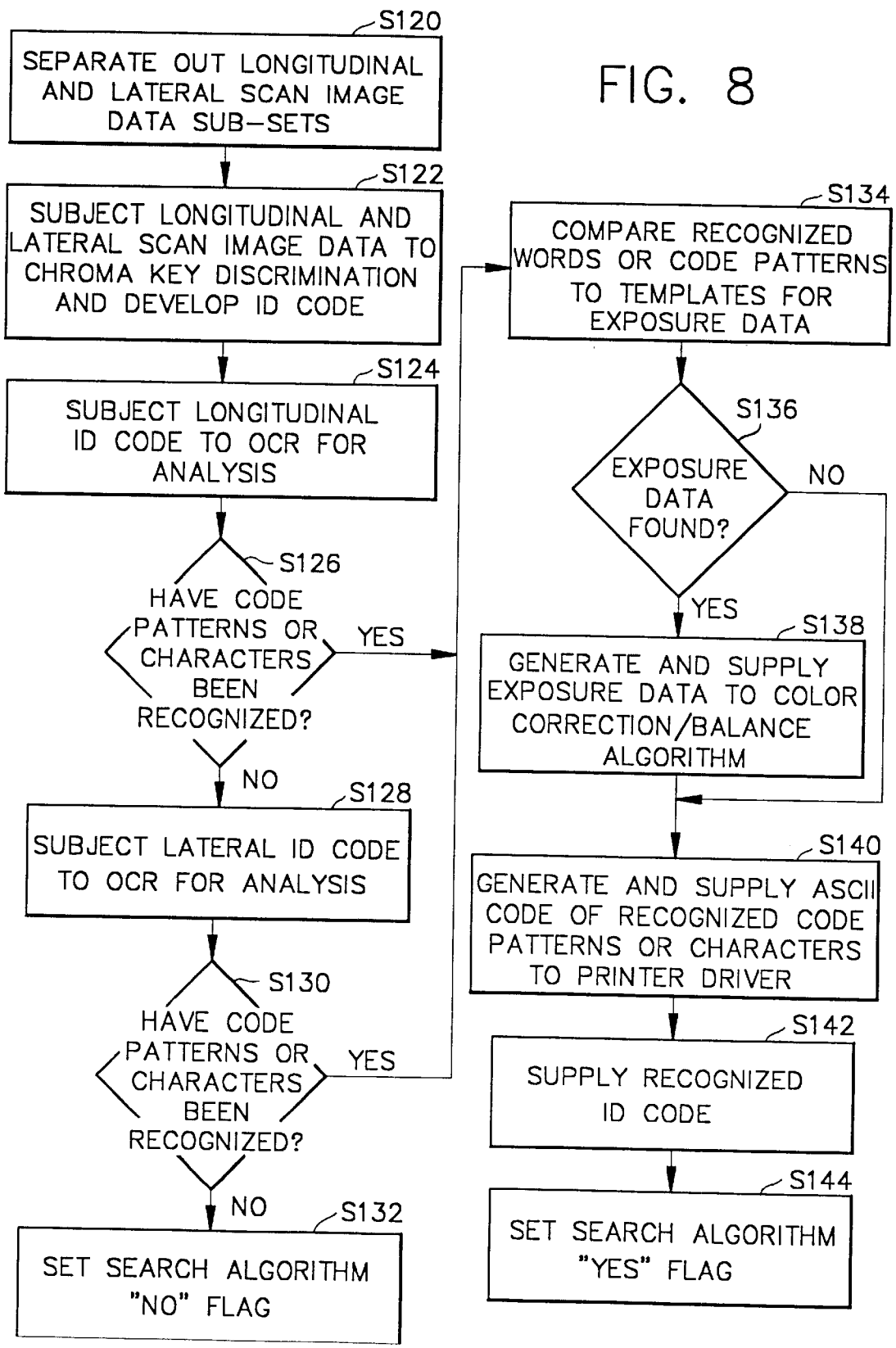
FIG. 8 is a flowchart of a search algorithm for detecting recorded information in a film image frame from a character image data sub-set usable in the system of FIG. 2 and flowchart of FIG. 7.
Figure 9:
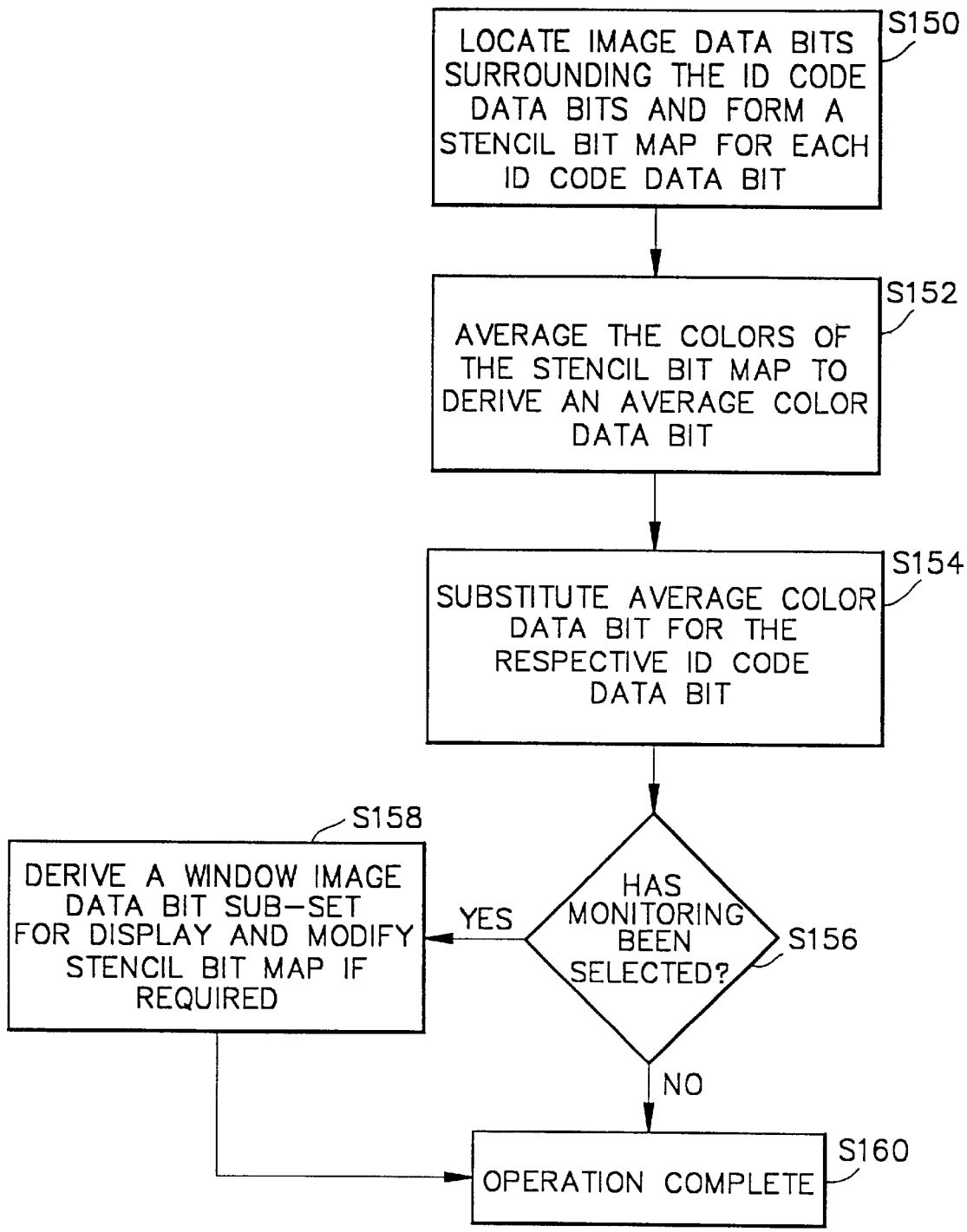
FIG. 9 is a flowchart of a re-touching algorithm for processing the character image data sub-set into a re-touch image data sub-set usable in the system of FIG. 2 and flowchart of FIG. 7.

The work station 34 operates under an overall operating algorithm depicted in FIG. 7 and the related algorithms of FIGS. 8 and 9, depending on the selected mode of operation, to develop the composite, color corrected, video display image data sets [R', G', B'] and printer image data sets [R", G", B"]. The work station 34 first separates out the character image data sub-set $[R, G, B]_s$ from the input scan image data set [R, G, B] by an area discrimination of the data set based on the assumption that the recorded information would appear, if present, in the lateral or longitudinal stripe region of the film image frame. In practice, the area discrimination is effected by a search algorithm invoked by the work station 34 to separate out two character image data sub-sets $[R, G, B]_{s1}$ and $[R, G, B]_{s2}$ corresponding spatially to longitudinal and lateral image frame edge regions where the recorded information 14, 14' is anticipated to be found, if present. Again, the longitudinal and lateral character image data sub-sets $[R, G, B]_{s1}$ and $[R, G, B]_{s2}$ include not only the character or code bits constituting recorded character information 14, 14' (if present) but also all of the color image data bits in the stripe regions.

Then, the separated out character image data sub-set $[R, G, B]_s$ is subjected to a feature extraction or chroma key discrimination algorithm based on the color assumption(s) of the camera LED arrays in use. In the latter process, the R, G, B image pixels or bits of the character image data sub-set $[R, G, B]_s$ are compared to the color threshold, and the locations of those bits that do match are flagged to develop a class bit-map. The chroma key discrimination algorithm is readily implemented in the work station 34 as a simple threshold color test or tests if more than one color comes into use. At present, the narrow, red LED wavelength is readily distinguished by the strong R signal level and absence of any G or B signal level in an R, G, B pixel exposed by that color.

Upon completion, the resulting class bit-map is a binary two-dimensional image that can be then processed by an optical character or optical code recognition (OCR) algorithm. In the present application, such a bit-map is also referred to as an identification (ID) code. The resulting class bit-map is readily recognized by conventional recognition techniques, e.g. those used by off the shelf OCR software in the work station 34, e.g. OmniPage® OCR software by Caere, Inc. or TextBridge®OCR software by Xerox Imaging Systems, Inc.

The OCR algorithm thus operates to decode or identify the recorded information and store it in memory for a variety of processing control, cropping or re-touching and printing operations. The recognized alphanumeric characters or code corresponding to the photographer input annotations and date and time information, and perhaps the exposure data, is also converted to a suitable format to be printed or written to Photo CD, e.g. an ASCII code. The stored exposure data, e.g. word 18 or an equivalent code pattern, that may be included in the recorded information is flagged by the OCR to be employed in the work station 34 to process the image data set [R, G, B]. It may not necessarily be converted to ASCII code or be printed or written to Photo CD for video display.

If the OCR algorithm does not identify the presence of any recorded information 14, 14' or exposure data 18, then the print 20 or Photo CD 50 is made in a conventional manner employing the entire scan image data set [R, G, B] for the film image frame 16, 16'. If the OCR algorithm does identify the recorded information 14, 14', 18 then two image frame operating modes can be followed.

In a first, full frame, operating mode, the ID code provided to the work station 34 is employed by the re-touching algorithm of FIG. 9 to fill in the identified character or code data bits with adjacent color data bits of the image (as described below) to form the composite, color corrected, video display image data set [R', G', B'] and printer image data set [R", G", B"].

Alternatively, the ID code is employed to direct the printing of the information in text appearing in an enhanced font overlying the area where the dot-matrix font text would otherwise be printed or appear. However, this alternative approach is preferably restricted to reprinting alpha-numeric characters.

In a second, cropped frame, operating mode, the ID code may be employed to simply discard the entire character image data sub-set $[R, G, B]_{s1}$ or $[R, G, B]_{s2}$ that it falls into. The remaining print image data sub-set $[R", G", B"]_r$ is then employed in creating the Photo CD 50 or making the print 20 with or without further cropping and with enlargement as necessary, depending on the print image aspect ratio and format, as described further below. The ASCII code is stored and used to record or print the text outside the print image 24 or Photo CD video image.

In either case, the film image 16, 16' is displayed on the video monitor 42, and the operator can introduce further changes in color balance or the like or can crop or enlarge a portion of the image to be reproduced. In an automated system, the video monitor 42 and the video display image data set [R', G', B'] may be eliminated. In either case, the print engine 44 is provided with the printer image data set [R", G", B"] and enabled to commence digital printing of the data set as a print 20. Alternatively, the Photo CD writer 48 may be provided with the printer image data set [R", G", B"] and enabled to commence digital writing of the data set to a Photo CD 50 in a suitable format.

In the digital system 30 depicted in FIG. 2, when the image is to be printed, the printer driver 40 is also enabled to print the text 22 either on the print 20 through the print engine 44 in either the first or second operating mode, or to print the text 22 on the print back 26, using a back side printer 46 in the first operating mode. Of course, the back side printer 46 may be part of the print engine 44 or the print 20 could be flipped over so that the information can be printed on the print back 26 by the print engine 44.

In use of the Photo CD writer 48 to write to Photo CD 50, the text 22 may be formatted to appear on the video image border or in some other fashion in relation to the video image displayed on playing the disk 50. The Photo CD writer 48 operates in response to the printer driver 40 to record the formatted ASCII code for reproduction as text displayed with the video image in a manner well known in the art.

The conversion of the character bits or code recognized by the OCR software into ASCII code allows an enhanced font to be chosen in printer driver 40 for use in printing the recorded information. Of course, any color can be chosen within the capabilities of the printer employed as well. A similar advantage can be realized in the conversion of the image data and information data to a Photo CD format.

Figure 3:
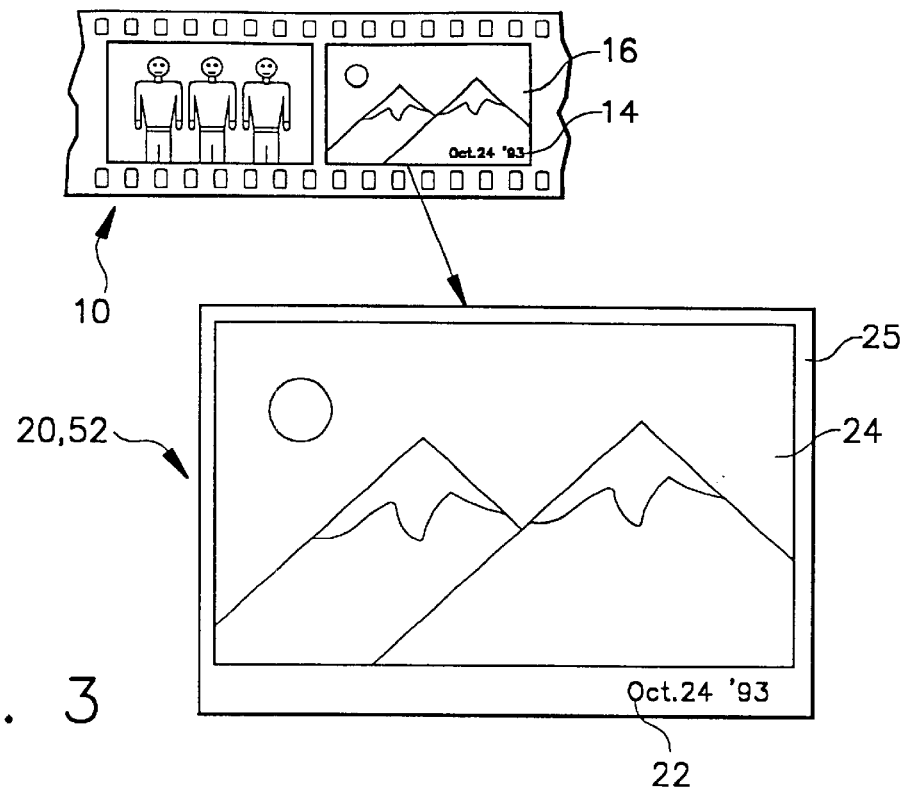
FIG. 3 is an illustration of a resulting print or video display format made in a first operating mode of the system of FIG. 2 from a film image wherein the recorded information appears in a border along one side or around the reproduced full frame image.

Turning to FIG. 3, it illustrates an alternate resulting print 20 made in the full frame operating mode by the print engine 44 containing the print image 24 surrounded by a matte frame 25 and the text 22 printed or appearing within the frame 25 or a Photo CD video image 52 in the same format. The matte frame 25 may be tagged onto the printer image data set [R", G", B"] by the work station 34 or may be functionally added in the print engine 44 or Photo CD writer. The printer driver 40 provides the character bit data content and font, and the print engine 44 superimposes it into the matte frame 25 when making a print 20. The colors of the frame 25 and the text 22 are preferably highly contrasting for ease of reading. The colors may be selected by the operator or automatically selected from a color palette to make a pleasing contrast with the predominant printed image color.

In the context of the resulting video frame image from Photo CD including the frame 25 containing the text 22, the printer driver 40 provides the character bit data content and font to the Photo CD writer 48 which 44 superimposes it into the matte frame 25 when encoding the disk 50 for the particular image field. In this case, it may be possible for the consumer to select the matte frame 25 and text 22 color combinations when operating the Photo CD player.

Figure 4:
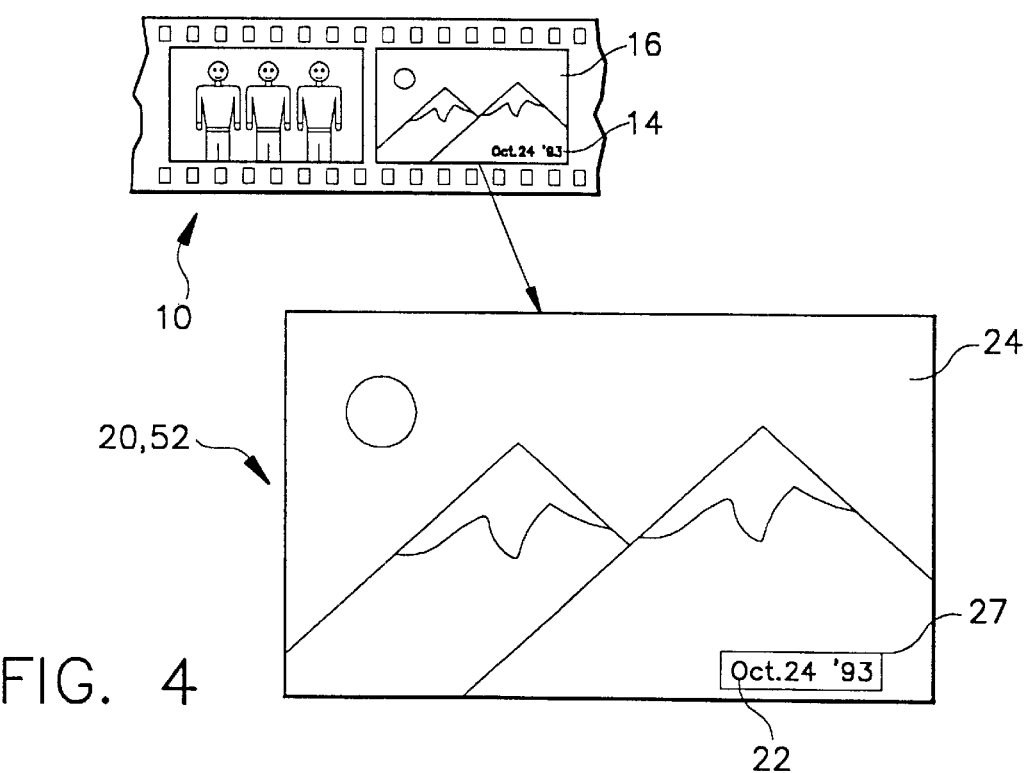
FIG. 4 is an illustration of an alternate format in the first operating mode wherein the recorded information appears in an enhanced balloon and/or with an enhanced print font within the full frame image for increased legibility.

Turning to FIG. 4, it displays the print or video image format of a further variation on the first operating mode of the system 30 as described above. It will be understood that the system 30 and the algorithm may be substantially simplified by substituting a bit enhancement algorithm for the re-touching algorithm and eliminating the printer driver 40 and back side printer 46. In this variation, once the ID code for the bit-map locations for the characters in the character image data sub-set $[R, G, B]_s$ are identified by OCR 38, the bit-map can be bracketed and written over with enhanced font character bits in a substitute bit-map set. In this fashion, even though the captured scene of print image 24 is obliterated in the same area as shown in FIG. 1, at least the color and font can be enhanced to render the print more pleasing than the dull red dot matrix font that would otherwise be present. Bright or contrasting colors to the surrounding image colors can be employed in the enhanced font. This variation can also be employed to enhance the image data set written to Photo CD 50 for video display of the Photo CD image 52.

FIG. 4 also illustrates a refinement of this variation wherein the enhanced font of the text 22 is itself enclosed in or surrounded by a balloon 28 within the print image 24 or the video display screen image. In this variation, after the locations of the recorded information data bits are identified within the character image data sub-set $[R, G, B]_s$, the ID code is employed to develop a balloon boundary data subset and stored for use in formatting the character font of the text. The background color of balloon 28 is pre-selected, and balloon color data bits are substituted for the R, G, B data bits of the image data set $[R, G, B]_b$ within the defined balloon boundary. The information data bits to be printed within the defined boundary are themselves defined in accordance with a pre-selected font and contrasting color bit map as in the enhanced font variation described immediately above.

The composite, color corrected, video display image data sets [R', G', B'] and printer image data sets [R", G", B"] including the balloon 28 and characters of the text 22 are thereby developed in the work station 34 and applied to the video monitor 42 and print engine 44 in the manner described above. Again, in this case, the ASCII code would not be employed in the printer driver 40 to drive the print engine 44. It will be understood that FIG. 4 also represents the resulting video frame Photo CD image 52 including the balloon 25 containing the text 22. In this case, it may also be possible for the viewer to select the balloon and font color combinations.

This process may also be employed to obliterate recorded information in a code pattern with the balloon 25. The decoded character can then be written into the balloon 25 in the same fashion.

Turning to the second, cropped frame, operating mode, the work station 34 operating algorithm may be simplified to an algorithm that masks out the character data sub-set $[R, G, B]_{s1}$ or $[R, G, B]_{s2}$ corresponding spatially to the longitudinal or lateral image frame edge strip area where the recorded information 14, 14' is actually found and defined by the ID code. The image data sub-set $[R, G, B]_{s1}$ or $[R, G, B]_{s2}$ is effectively discarded. The algorithm in work station 34 processes only the remaining image data set $[R, G, B]_r$ to develop the color corrected, video display image data sets [R', G', B'] and printer image data sets [R", G", B"] for displaying the image and making the print 20 or Photo CD 50. In this fashion, the algorithm effectively crops the original image 16, 16' to exclude the region containing the recorded information (and possibly a stripe along the adjoining edge of the image, depending on the image frame and print formats).

The recorded information 14, 14' is still identified or decoded from the character data sub-set $[R, G, B]_s$ and may be employed to print the recorded information on the print back 26 using the back side printer 46 as shown in FIG. 2. The printer image data set [R", G", B"] representing the cropped image may be magnified by the print engine 44 to fill the entire print image 24 as shown in FIG. 2 or recorded as the Photo CD video image frame.

Figure 5:
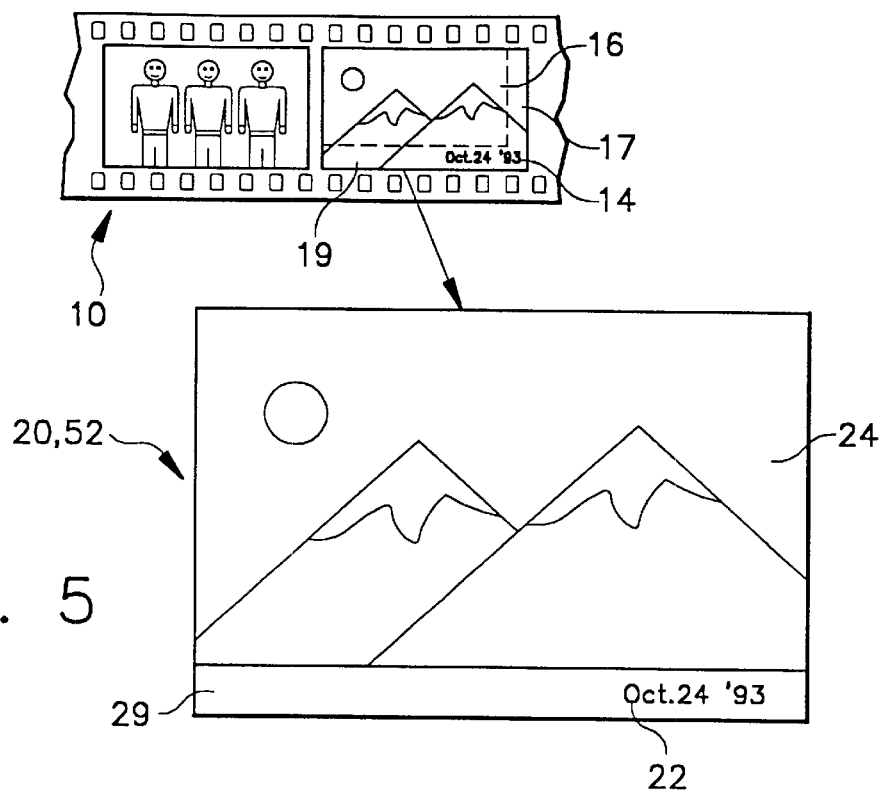
FIG. 5 is an illustration of a resulting format in a second operating mode of the system of FIG. 2 from a film image wherein the recorded information appears in a border along one side or around the reproduced cropped frame image.

FIG. 5 illustrates how a print or video image 24 and text 22 can be formatted and printed or displayed on the same side of the image 24 employing the second operating mode which also simplifies the operating algorithm at the cost of sacrificing a lateral stripe 17, 17' and longitudinal stripe 19, 19' of the film image 16, 16'. A longitudinal border 27 of the print 20 is created in the manner described above with respect to FIG. 3. The text 22 is printed by the print engine 44 or Photo CD writer 48 in response to the ASCII code supplied to the printer driver 40 also as described above. Of course, the matte frame 25 of FIG. 3 may be substituted for the border 27. The cropped image may be magnified as necessary by the print engine 44 or photo CD writer 48 to fill the print image 24 or video image frame.

Figure 6:
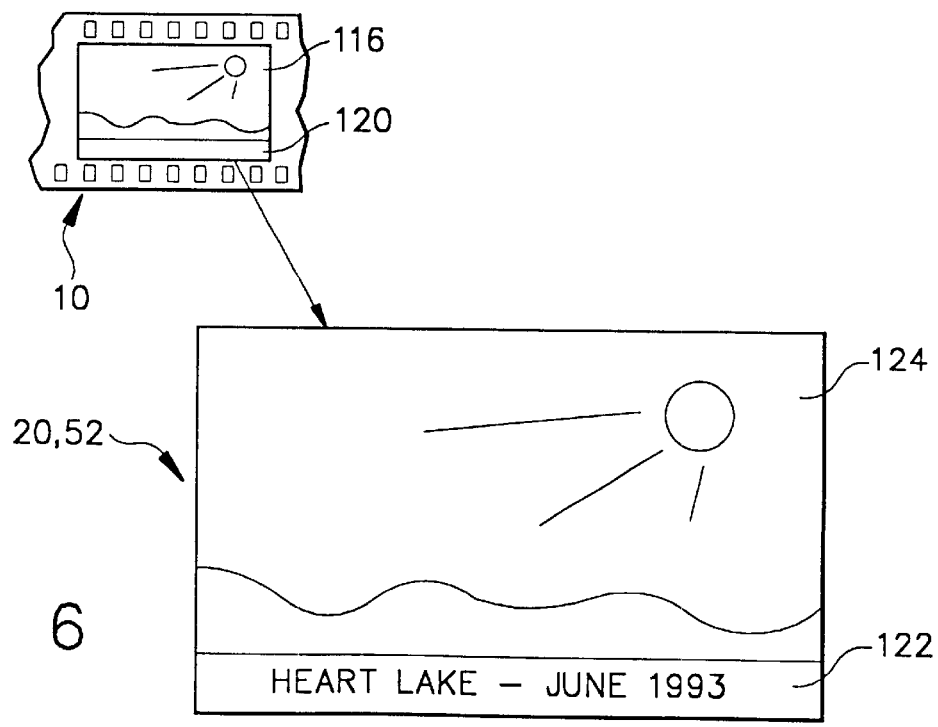
FIG. 6 is an illustration of an alternate embodiment of the invention wherein encoded optical data occupying an edge stripe region within the film image frame is decoded and reprinted with the associated reproduced image.

Turning now to FIG. 6, it is an illustration of the code pattern exposed in a stripe region 120 along the edge of and within the film image 116. As described above, the film image 116 is scanned to derive the scan image data set [R, G, B], and the longitudinal character data image sub-set $[R, G, B]_{s1}$ corresponding to stripe region 120 is separated out for chroma key discrimination. The resulting ID code is subjected to OCR, decoded and reprinted as information 122 with the associated reproduced image 124 in a manner similar to that of the second operating mode as described above.

Depending on the recording density in the stripe 120, it may or may not be possible to employ a re-touching algorithm to fill in the reproduced image in the area of stripe 120. The preferable approach would follow the second operating mode to make a print image or store the remaining image in a Photo CD field while printing the decoded ASCII character font of the printed information in one of the formats described above with respect to FIGS. 2 and 5.

In each of the illustrated embodiments of FIGS. 3–6, it will be understood that the orientation of the text 22 or code pattern in stripe region 120 and the associated matte frame 25, balloon 28, or border 27, if present, with respect to the print image 24 may be longitudinal as shown or lateral, depending, of course as to where the recorded information 14, 14' appears on the film image 16, 16'.

It should be noted in this regard that not all cameras employ the dual function LED array system of the above-referenced '702 patent, and so the recorded information 14, 14' almost always appears along the longitudinal edge of the film image 16, 16' on the assumption that most photos are taken with the camera oriented horizontally to the horizon. Therefore, when the camera is oriented vertically, the recorded message appears along the side of the image. The use of the video monitor 42 by an operator allows the orientation to be known, and, in a further variation, the text 22 can be properly placed in the proper orientation so that it can be read as the image is viewed or displayed from the Photo CD. Consequently, the control apparatus 36 may be used to invoke a rotation algorithm for formatting the printed text 22 in proper orientation to the reproduced image 24 in accordance with any of the FIGS. 3–5.

Turning to FIG. 7, it illustrates the overall operation of the system 30 of FIG. 2, that may be configured in any of these operating modes and variations, in a flowchart starting with a scan image data set [R, G, B]. In step S100, the character image data sub-set $[R, G, B]_s$ is identified in the work station 34 and provided to the OCR 38 for searching in accordance with the search algorithm illustrated in FIG. 8 for detecting recorded information 14, 14' from the character image data sub-set. As described above, both longitudinal and lateral character image data sub-sets $[R, G, B]_{s1}$ and $[R, G, B]_{s2}$ may be so identified and provided. The search algorithm results in the ID code and the ASCII code if recorded information is found or a negative indication is provided by the OCR software to the work station 34. In decision step S102, the search results are checked. If recorded information bits are not found, the full scan image data set is processed to provide an untouched video display image data set [R', G', B'] and printer image data set [R", G", B"] that are used for video display by monitor 42 and printing with the print engine 44 or Photo CD writer 48 in a standard printing technique in step S104.

If recorded information is found, the operating mode and digital processing technique for formatting the printing of the text 22 in association with the reproduced image 24 is selected in step S106, and the process is followed in step S108. The process technique depends on which of the formats illustrated in FIGS. 2–5 are selected for the resulting print 20 or Photo CD video display. In step S110, the print 20 or Photo CD 50 is imprinted in accordance with the operating mode and format selected.

Turning to FIG. 7, it illustrates the search algorithm of steps S100 and S102 in greater detail. In block S120, a longitudinal character image data sub-set $[R, G, B]_{s1}$ and a lateral character image data sub-set $[R, G, B]_{s2}$ are identified in the work station 34. The sub-sets $[R, G, B]_{s1}$ and $[R, G, B]_{s2}$ are then subjected to the chroma key discrimination described above in step S122. The resulting ID codes of the class bit-maps for each data sub-set are thereby generated and stored. In step S126, the ID code of the longitudinal character image data sub-set $[R, G, B]_{s1}$ data bits are subjected to OCR analysis to identify any code pattern or characters in the bits of characteristic wavelengths employed in exposing the recorded information 14, 14'. In decision step 126, the results of the OCR analysis of the longitudinal character image data sub-set $[R, G, B]_{s1}$ is checked. If no characters or code patterns are found, then the ID code corresponding to the lateral character image data sub-set $[R, G, B]_2$ is subjected to OCR in the same fashion in step S128. In decision step 130, the results of the OCR analysis of the lateral character image data sub-set $[R, G, B]_{s2}$ is checked. If no characters or code patterns are found in either OCR analysis in steps S124 and S128, then the search algorithm "NO" flag is set in step S132, and the search algorithm is exited to step S104 of FIG. 6. These steps S122–S130 may be repeated for the different hues typically used to record optical code patterns or characters in the cameras.

If characters or code patterns are found in either OCR analysis of steps S124 and 128, they are then subjected to comparison to stored exposure data code patterns or character words in step S134. If found in decision step S136, then the Exposure Data Commands are generated in step S136 and supplied to the classification and color correction and balance algorithm employed in the work station to process the scan image data set [R, G, B] into the printer image data set [R", G", B"] for the reproduction process employed.

After step S138 or if no exposure data is found in step S136, the ASCII code of the recognized characters or code is supplied to the printer driver 40 in step S140, whether or not it is in fact used. The ID code is also supplied to the work station 34 in step S142. The search algorithm "YES" flag is set in step S144, and the search algorithm is exited to step S106 of FIG. 7.

Returning to step S108, the operating mode including the specific variations thereof described above is selected the operator or pre-selected. In step S108, the operation in accordance with the second operating mode is fairly straightforward, involving simply discarding the longitudinal character image data sub-set $[R, G, B]_{s1}$ or lateral character image data sub-set $[R, G, B]_{s2}$ where the recorded information is found, formatting the print data set to the print image format selected and printing the ASCII character set in the selected place using the selected font as described above.

The operations in step S108 in the first operating mode, and particularly involving filling in the ID code data bits identified in step S122 of FIG. 8 is further illustrated in the re-touching algorithm of FIG. 9. In step S150 of FIG. 9, the image data bits surrounding the ID code data bits are located to form a stencil bit map for each ID code data bit or group of ID code data bits making up part or all of a character or code pattern. In step S152, the colors of the stencil bit map data bits are averaged to derive an average color data bit. In step S154, the average color data bit is substituted for the respective ID code data bit. In step S158, an overall window image data bit sub-set may be derived and color balanced for display on the monitor 42, if operator monitoring is selected in step S156. In this case, the operator may view the re-touched image to ensure a suitable result is achieved and may repeat the operation, perhaps employing a wider or narrower scope of the stencil bit map. At step S160, the algorithm is exited, returning to step S110 of FIG. 7.

Many alternative re-touching algorithms are known for reconstructing images in an equivalent fashion. For example, U.S. Pat. No. 4,516,155 discloses a color smoothing process that may be employed to weight and average the trichromatic color image data bit values surrounding each character data bit marked by the ID code to derive substitute color values therefore. Regardless of the re-touching algorithm selected, the print image 24 of FIGS. 2 and 3 is filled in by a re-touch image data sub-set $[R, G, B]_r$ so that the full film image 16, 16' can be printed in the print 20 or digitally written to the Photo CD disk 50.

Alternatively, step S108 may involve substituting an enhanced font with or without the balloon 28 in the simplified digital processing technique resulting in the print 20 format illustrated in FIG. 4.

Figure 10:
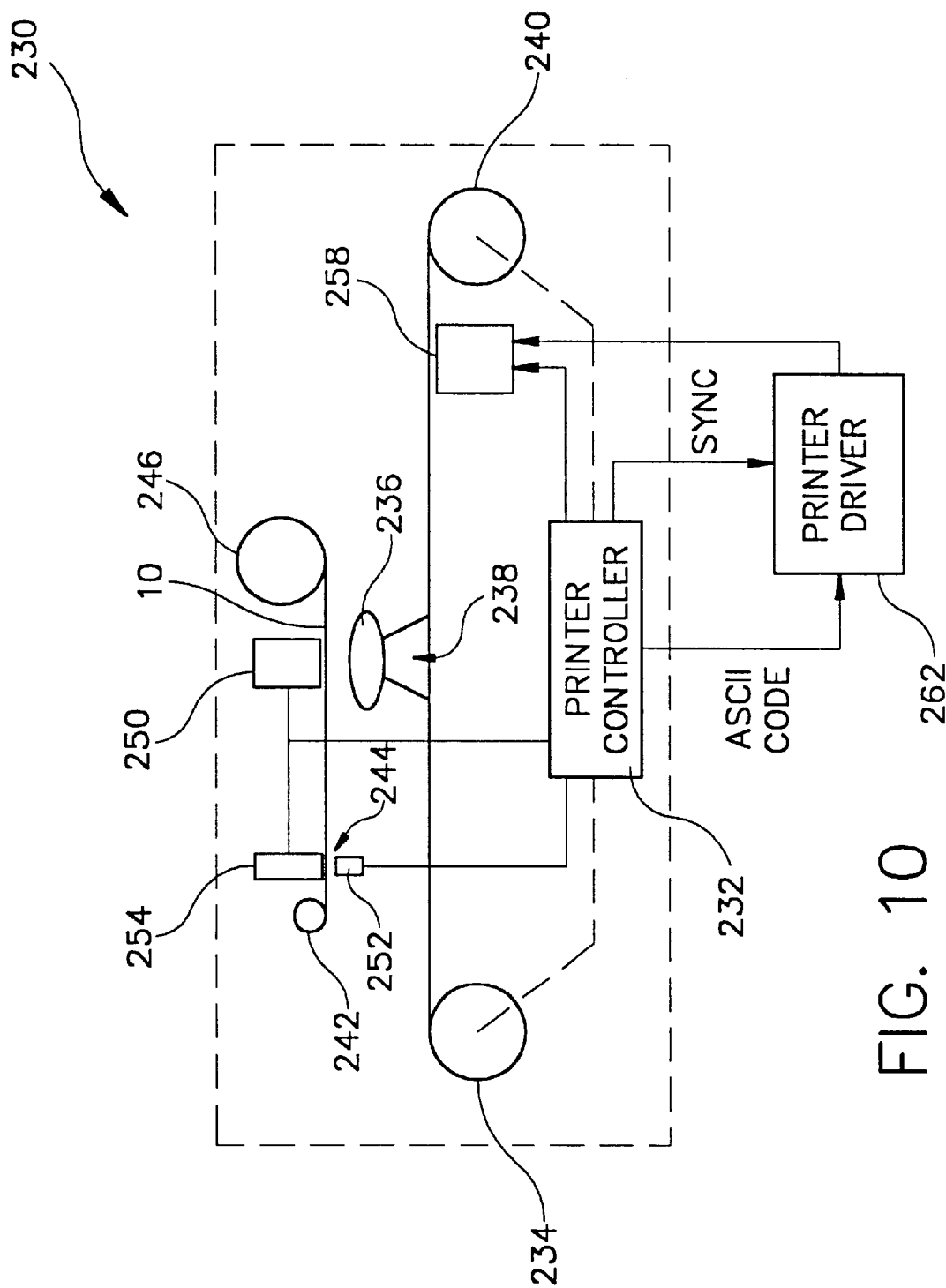
FIG. 10 is a block diagram of a prior art optical printer of the type having a film image scanner for identifying either printed character or encoded image frame recorded information and an LED array character printer in which the second operating mode method of printing may be carried out.

Turning to FIG. 10, it is an illustration of a further alternate embodiment system 230 wherein certain of the common principles of the invention are also usable with a conventional photographic optical printer. This embodiment may only be practiced to produce photographic prints 20 and preferably approximates the second operating mode. The printer 230 includes a printer controller 232 for operating a paper advance system, a film advance system, a film scanning station, an exposure lamphouse and optical system, and an alphanumeric printer in a manner well known in the art. Typically, a photographic paper drive mechanism coupled to paper feed roll 234 and paper takeup roll 240 to advance fresh paper into an exposure station 238 and from the exposure station 238 and onto a takeup roll 240 each time a print is made. The filmstrip 10 is advanced from a filmstrip supply reel 242 through the scanning station 244, the exposure station 238 and to a filmstrip takeup reel 246 as each exposure is made. The exposure is made by the lamphouse 250 under the control of the printer controller 232 in response to the image frame density and color data derived from the scanning station 244 in a manner well known in the art.

The scanning station 244 comprises a linear CCD scanner or photocell array 252 that detects the color intensities of light emitter by light source 254 transmitted through the negative image frame. The scan image data set is derived and stored for processing in the manner described below. As a result of the processing, an indication of the presence of recorded information is obtained, the image frame is cropped for printing and the ASCII code is provided to the printer driver 262. The ID code is used by the printer controller 232 to set the enlargement of the optical system 236 and lamphouse 250 to crop and enlarge the print image to exclude the stripe region in the manner shown above with respect to FIGS. 5 and 6 and make the exposure of the cropped image. The printer driver 262 operates the back side print head or a front side border print head 258 in synchronism with the advancement of the paper 238 so that the recorded information and other information supplied by the printer controller 232 appears on the back side or border of the proper print.

In accordance with this embodiment of the present invention, the scan image data set [R, G, B] is processed by the same algorithm of FIG. 8 as described above in printer controller 232, which is configured in the same fashion as work station 34 of FIG. 2, in conjunction with the alternate operating flowchart of FIG. 11. In FIG. 11, the steps S200, S202 and S204 correspond to steps S100, S102 and S104 of FIG. 7, and step S200 incorporates steps S120–S144 of FIG. 8. At step S206, the printer controller sets the exposure parameters of the lamphouse 250 (in synchronism with the advancement of the negative filmstrip image frame into the exposure gate) in response to the color correction and exposure parameters determined by analysis of the scan image data set and the exposure data commands derived in step S138, if any. In step S208, the image frame is cropped by automatically setting the magnification of the lens 236 with respect to the paper mask of the printer to cut-off the stripe region containing the exposed characters or code patterns and either expose the full surface of the photographic paper or leave an unexposed border. In step S210, the exposure is made. In step S212, the paper 238 and the negative filmstrip 10 are advanced so that the next exposure can be made. At step S214, the character print head 258 is enabled to print the alpha-numeric date, annotation and, optionally, the exposure data on the back side or face border of the print in synchronization with advancement of the print to the print head location.

In other words, the recorded information 14, 14' of FIGS. 1–5 or the coded information of FIG. 6 may be recognized or decoded and printed either on the back of the print 20 or in a frame or side edge adjacent to the print image 24. Again, the second operating mode would preferably be followed to crop the film image 16, 16' to exclude the recorded information 14, 14' or stripe 120, decode or recognize its content, optically print the cropped image, and digitally print the print information either on the back of the print 20 or in one of the formats included in the above description of FIG. 5.

Although the present invention has been fully described with reference to the preferred embodiments thereof, many modifications and variations thereof will be apparent to those skilled in the art without departing from the spirit and scope thereof.

PARTS LIST FOR FIGS. 1–11 negative filmstrip 10
transparency 12
recorded information 14, 14'
film image frames 16, 16', 16"
lateral stripe 17, 17'
exposure data 18
longitudinal stripe 19, 19'
print or video image 20
text 22
print or video image 24
matte frame 25
print back 26
longitudinal border 27
balloon 28
system 30
film scanner 32
work station 34
control apparatus 36
printer driver 40
video monitor 42
print engine 44
back side printer 46
Photo CD writer 48
Photo CD 50
Photo CD image 52
film image 116
film image frame stripe 120
information 122
reproduced image 124
modified system 130
encoded information reader 138
alternate embodiment system 230
printer controller 232
paper feed roll 234
exposure station 238
paper takeup roll 240
filmstrip supply reel 242
scanning station 244
filmstrip takeup reel 246
lamphouse 250
linear CCD scanner or photocell array 252
character print head 258
printer driver 262
red, green, and blue scan image data set [R, G, B]
color corrected, video image data set [R', G', B']
color corrected printer image data set [R", G", B"]
character image data sub-set $[R, G, B]_s$
longitudinal character image data sub-set $[R, G, B]_{s1}$
lateral character image data sub-set $[R, G, B]_{s2}$
remaining printer image data set $[R", G", B"]_r$
re-touch image data sub-set $[R, G, B]_r$
ASCII code sub-set

What is claimed is:

1. A method of making a reproduction image of a film image frame containing both an exposed image and camera recorded information exposed within the exposed image frame by operation of a camera comprising the steps of:

(a) scanning the film image frame to develop a scan image data set therefrom containing both exposed image and camera recorded information;

(b) searching for and recognizing characteristics of camera recorded information in the scan image data set (c) from the recognized characteristics, generating a camera recorded, image data sub-set within the scan image data set;

(d) determining the information content of the camera recorded, image data sub-set;

(e) based upon the determined information content, developing a substitute image data sub-set for the camera recorded, image data sub-set;

(f) substituting the substitute image data sub-set for the camera recorded, image data sub-set within the scan image data set to thereby provide a reproduction image data set; and (g) reproducing a reproduction image from the reproduction image data set, wherein the camera recorded information comprises optically exposed, alpha-numeric characters in text intended for reproduction in reproduction images made from the film image frame, and the method is operable in a full image frame reproduction mode wherein:

step (d) further comprises identifying a character bit-map of the camera recorded, image data sub-set; and step (e) further comprises subjecting the character image data subs-et within the character bit-map to a re-touching algorithm of each data bit to create a re-touch image data sub-set of data bits to be substituted for the identified data bits in the character bit-map as the substitute image data sub-set, whereby the alpha-numeric characters are not recognizable in the reproduction image made from the reproduction image data set.

2. The method of claim 1 further comprising the step of
(h) reproducing the alpha-numeric characters in association with but outside the image area of the reproduction image.

3. The method of claim 1 wherein:
step (g) further comprises printing said reproduction image from the reproduction image data set as a print image on a surface of a print paper; and further comprising the step of
(h) reproducing the alpha-numeric characters on a border area of the print paper in association with but outside the area of the print image.

4. The method of claim 1 wherein:
step (g) further comprises printing said reproduction image from the reproduction image data set as a print image on a front surface of a print paper; and further comprising the step of
(h) reproducing the alpha-numeric characters on a back surface of the print paper.

5. The method of claim 1 wherein:
step (g) further comprises displaying said reproduction image data set as a video display image; and further comprising the step of
(h) reproducing the alpha-numeric characters on a border area of the video display image in association with but outside the area of the video display image.

6. The method of claim 1 wherein:
step (g) further comprises recording said reproduction image in a Photo CD adapted to provide a video display image when played; and further comprising the step of
(h) recording the alpha-numeric characters in the Photo CD to appear on a border area of the video display image in association with but outside the area of the video display image.

7. The method of claim 1 wherein the camera recorded information comprises optically exposed, camera exposure data intended for use in controlling reproduction of the reproduction images made of the exposed image and wherein step (d) further comprises:
(1) determining that the camera recorded image data sub-set constitutes camera exposure data; and
(2) processing the scan image data set in accordance with the camera exposure data to provide an exposure and color balanced scan image data set.

8. A method of making a reproduction image of a film image frame containing both an exposed image and camera recorded information exposed within the exposed image frame by operation of a camera comprising the steps of:
(a) scanning the film image frame to develop a scan image data set therefrom containing both exposed image and camera recorded information;
(b) searching for and recognizing characteristics of camera recorded information in the scan image data set
(c) from the recognized characteristics, generating a camera recorded, image data sub-set within the scan image data set;
(d) determining the information content of the camera recorded, image data sub-set;
(e) based upon the determined information content, developing a substitute image data sub-set for the camera recorded, image data sub-set;
(f) substituting the substitute image data sub-set for the camera recorded, image data sub-set within the scan image data set to thereby provide a reproduction image data set; and
(g) reproducing a reproduction image from the reproduction image data set, wherein the camera recorded information comprises optically exposed, camera exposure data intended for use in controlling reproduction of the reproduction images made of the exposed image and wherein step (d) further comprises:
(1) determining that the camera recorded image data sub-set constitutes camera exposure data; and
(2) processing the scan image data set in accordance with the camera exposure data to provide an exposure and color balanced scan image data set.

9. A method of making a reproduction image of a film image frame containing both an exposed image and camera recorded information exposed within the exposed image frame by operation of a camera comprising the steps of:
(a) scanning the film image frame to develop a scan image data set therefrom containing both exposed image and camera recorded information;
(b) searching for and recognizing characteristics of camera recorded information in the scan image data set
(c) from the recognized characteristics, generating a camera recorded, image data sub-set within the scan image data set;
(d) determining the information content of the camera recorded, image data sub-set;
(e) based upon the determined information content, developing a substitute image data sub-set for the camera recorded, image data sub-set;
(f) substituting the substitute image data sub-set for the camera recorded, image data sub-set within the scan image data set to thereby provide a reproduction image data set; and
(g) reproducing a reproduction image from the reproduction image data set, wherein the camera recorded information comprises optically exposed, alpha-numeric characters in text intended for reproduction in reproduction images made from the film image frame, and the method is operable in an enhanced font, image reproduction mode wherein step (d) further comprises:
(1) identifying a character bit-map of the camera recorded, image data sub-set; and
(2) decoding the alpha-numeric characters from the character bit-map; and
step (e) further comprises encoding the substitute image data sub-set with character bit-maps of enhanced font alpha-numeric characters corresponding to the decoded alpha-numeric characters having a selected, enhanced font color and appearance,
whereby the alpha-numeric characters are reproduced within the reproduction image made from the reproduction image data set with an enhanced font appearance and color.

10. A method of making a reproduction image of a film image frame containing both an exposed image and camera recorded information exposed within the exposed image frame by operation of a camera comprising the steps of:

(a) scanning the film image frame to develop a scan image data set therefrom containing both exposed image and camera recorded information;

(b) searching for and recognizing characteristics of camera recorded information in the scan image data set (c) from the recognized characteristics, generating a camera recorded, image data sub-set within the scan image data set;

(d) determining the information content of the camera recorded, image data sub-set;

(e) based upon the determined information content, developing a substitute image data sub-set for the camera recorded, image data sub-set;

(f) substituting the substitute image data sub-set for the camera recorded, image data sub-set within the scan image data set to thereby provide a reproduction image data set; and (g) reproducing a reproduction image from the reproduction image data set, wherein the camera recorded information comprises optically exposed, alpha-numeric characters in text intended for reproduction in reproduction images made from the film image frame, and the method is operable in an enhanced font, image reproduction mode wherein step (d) further comprises:

(1) identifying a bit-map of said scan image data set encompassing at least the character bit-map of the camera recorded, image data sub-set and a surrounding border region; and (2) decoding the alpha-numeric characters from the character bit-map; and step (e) further comprises encoding the substitute image data sub-set with character bit-maps of enhanced font, alpha-numeric characters corresponding to the decoded alpha-numeric characters having a selected, enhanced font color and appearance and with an enhanced, contrasting color, border region spatially surrounding said enhanced font, alpha-numeric characters together forming said substitute image data sub-set, whereby the alpha-numeric characters are reproduced within the reproduction image made from the reproduction image data set with an enhanced font appearance and color surrounded by a contrasting color border.

11. The method of either claim 9 or 10 wherein:

step (g) further comprises printing said reproduction image from the reproduction image data set as a print image on a surface of a print paper.

12. The method of either claim 9 or 10 wherein:

step (g) further comprises displaying said reproduction image data set as a video display image.

13. The method of either claim 9 or 10 wherein:

step (g) further comprises recording said reproduction image in a Photo CD adapted to provide a video display image when played.

14. A method of making a reproduction image of a film image frame containing both an exposed image and camera recorded information exposed within the exposed image frame by operation of a camera comprising the steps of:

(a) scanning the film image frame to develop a scan image data set therefrom containing both exposed image and camera recorded information;

(b) searching for and recognizing characteristics of camera recorded information in the scan image data set (c) from the recognized characteristics, generating a camera recorded, image data sub-set within the scan image data set;

(d) determining the information content of the camera recorded, image data sub-set;

(e) based upon the determined information content, developing a substitute image data sub-set for the camera recorded, image data sub-set;

(f) substituting the substitute image data sub-set for the camera recorded, image data sub-set within the scan image data set to thereby provide a reproduction image data set; and (g) reproducing a reproduction image from the reproduction image data set, wherein the camera recorded information comprises optically exposed, alpha-numeric characters in text intended for reproduction in reproduction images made from the film image frame, and the method is operable in a cropped image reproduction mode wherein:

step (d) further comprises identifying a character bit-map of the camera recorded, image data sub-set; and step (e) further comprises developing the substitute image data sub-set as a portion of said scan image encompassing at least the character bit-map to be masked from said reproduction image data set, whereby said reproduction image data set comprises the scan image data set cropped in an area encompassing at least the character bit-map.

15. The method of claim 14 further comprising the step of (h) reproducing the alpha-numeric characters in association with but outside the image area of the reproduction image.

16. The method of claim 14 wherein:

step (g) further comprises printing said reproduction image from the reproduction image data set as a print image on a surface of a print paper; and further comprising the step of (h) reproducing the alpha-numeric characters on a border area of the print paper in association with but outside the area of the print image.

17. The method of claim 14 wherein:

step (g) further comprises printing said reproduction image from the reproduction image data set as a print image on a front surface of a print paper; and further comprising the step of (h) reproducing the alpha-numeric characters on a back surface of the print paper.

18. The method of claim 14 wherein:

step (g) further comprises displaying said reproduction image data set as a video display image; and further comprising the step of (h) reproducing the alpha-numeric characters on a border area of the video display image in association with but outside the area of the video display image.

19. The method of claim 14 wherein:

step (g) further comprises recording said reproduction image in a Photo CD adapted to provide a video display image when played; and further comprising the step of (h) recording the alpha-numeric characters in the Photo CD to appear on a border area of the video display image in association with but outside the area of the video display image.

20. A method of making a reproduction image of a film image frame containing both an exposed image and camera recorded information exposed within the exposed image frame by operation of a camera comprising the steps of:

(a) scanning the film image frame to develop a scan image data set therefrom containing both exposed image and camera recorded information;

(b) searching for and recognizing characteristics of camera recorded information in the scan image data set (c) from the recognized characteristics, generating a camera recorded, image data sub-set within the scan image data set;

(d) determining the information content of the camera recorded, image data sub-set;

(e) based upon the determined information content, developing a substitute image data sub-set for the camera recorded, image data sub-set;

(f) substituting the substitute image data sub-set for the camera recorded, image data sub-set within the scan image data set to thereby provide a reproduction image data set; and (g) reproducing a reproduction image from the reproduction image data set, wherein the camera recorded information comprises optically exposed, camera exposure data intended for use in controlling reproduction of the reproduction images made of the exposed image, and the method is operable in a cropped image reproduction mode, wherein step (d) further comprises:

(1) identifying a character bit-map of the camera recorded, image data sub-set; and (2) determining that the camera recorded image data sub-set constitutes camera exposure data;

step (e) further comprises developing the substitute image data sub-set as a portion of said scan image encompassing at least the character bit-map to be masked from said reproduction image data set; and step (g) further comprises processing the scan image data set in accordance with the camera exposure data to provide an exposure and color balanced reproduction image data set, whereby said reproduction image data set comprises the scan image data set cropped in an area encompassing at least the character bit-map to develop the substitute image data sub-set.

21. The method of claim 20 further comprising the step of (h) reproducing the camera exposure data in association with but outside the image area of the reproduction image.

22. Apparatus for making a reproduction image of a film image frame containing both an exposed image and camera recorded information exposed within the exposed image frame by operation of a camera comprising:

(a) means for scanning the film image frame to develop a scan image data set therefrom containing both exposed image and camera recorded information;

(b) means for searching for and recognizing characteristics of camera recorded information in the scan image data set (c) means responsive to the recognized characteristics for generating a camera recorded, image data sub-set within the scan image data set;

(d) means for determining the information content of the camera recorded, image data sub-set;

(e) means responsive to the determined information content for developing a substitute image data sub-set for the camera recorded, image data sub-set;

(f) means for substituting the substitute image data sub-set for the camera recorded, image data sub-set within the scan image data set to thereby provide a reproduction image data set; and (g) means for reproducing a reproduction image from the reproduction image data set, wherein the camera recorded information comprises optically exposed, alpha-numeric characters in text intended for reproduction in reproduction images made from the film image frame, and is operable in a full image frame reproduction mode wherein:

step (d) further comprises means for identifying a character bit-map of the camera recorded, image data sub-set; and means (e) further comprises means for subjecting the character image data sub-set within the character bit-map to a re-touching algorithm of each data bit to create a re-touch image data sub-set of data bits to be substituted for the identified data bits in the character bit-map as the substitute image data sub-set, whereby the alpha-numeric characters are not recognizable in the reproduction image made from the reproduction image data set.

23. The apparatus of claim 22 further comprising:

(h) means for reproducing the alpha-numeric characters in association with but outside the image area of the reproduction image.

24. The apparatus of claim 22 wherein:

means (g) further comprises means for printing said reproduction image from the reproduction image data set as a print image on a surface of a print paper; and further comprising:

(h) means for reproducing the alpha-numeric characters on a border area of the print paper in association with but outside the area of the print image.

25. The apparatus of claim 22 wherein:

means (g) further comprises means for printing said reproduction image from the reproduction image data set as a print image on a front surface of a print paper; and further comprising:

(h) means for reproducing the alpha-numeric characters on a back surface of the print paper.

26. The apparatus of claim 22 wherein:

means (g) further comprises means for displaying said reproduction image data set as a video display image; and further comprising:

(h) means for reproducing the alpha-numeric characters on a border area of the video display image in association with but outside the area of the video display image.

27. The apparatus of claim 22 wherein:

means (g) further comprises means for recording said reproduction image in a Photo CD adapted to provide a video display image when played; and further comprising:

(h) means for recording the alpha-numeric characters in the Photo CD to appear on a border area of the video display image in association with but outside the area of the video display image.

28. The apparatus of claim 22 wherein the camera recorded information comprises optically exposed, camera exposure data intended for use in controlling reproduction of the reproduction images made of the exposed image and wherein means (d) further comprises:

(1) means for determining that the camera recorded image data sub-set constitutes camera exposure data; and (2) means for processing the scan image data set in accordance with the camera exposure data to provide an exposure and color balanced scan image data set.

29. The apparatus of claim 22 wherein the camera recorded information comprises optically exposed, alphanumeric characters in text intended for reproduction in reproduction images made from the film image frame, and the apparatus is operable in a cropped image reproduction mode wherein:

means (d) further comprises means for identifying a character bit-map of the camera recorded, image data sub-set; and means (e) further comprises means for developing the substitute image data sub-set as a portion of said scan image encompassing at least the character bit-map to be masked from said reproduction image data set, whereby said reproduction image data set comprises the scan image data set cropped in an area encompassing at least the character bit-map to develop the substitute image data sub-set.

30. The apparatus of claim 29 further comprising:

(h) means for reproducing the alpha-numeric characters in association with but outside the image area of the reproduction image.

31. The apparatus of claim 29 wherein:

means (g) further comprises means for printing said reproduction image from the reproduction image data set as a print image on a surface of a print paper; and further comprising:

(h) means for reproducing the alpha-numeric characters on a border area of the print paper in association with but outside the area of the print image.

32. The apparatus of claim 29 wherein:

means (g) further comprises means for printing said reproduction image from the reproduction image data set as a print image on a front surface of a print paper; and further comprising:

(h) means for reproducing the alpha-numeric characters on a back surface of the print paper.

33. The apparatus of claim 29 wherein:

means (g) further comprises means for displaying said reproduction image data set as a video display image; and further comprising:

(h) means for reproducing the alpha-numeric characters on a border area of the video display image in association with but outside the area of the video display image.

34. The apparatus of claim 29 wherein:

means (g) further comprises means for recording said reproduction image in a Photo CD adapted to provide a video display image when played; and further comprising:

(h) means for recording the alpha-numeric characters in the Photo CD to appear on a border area of the video display image in association with but outside the area of the video display image.

35. Apparatus for making a reproduction image of a film image frame containing both an exposed image and camera recorded information exposed within the exposed image frame by operation of a camera comprising:

(a) means for scanning the film image frame to develop a scan image data set therefrom containing both exposed image and camera recorded information;

(b) means for searching for and recognizing characteristics of camera recorded information in the scan image data set (c) means responsive to the recognized characteristics for generating a camera recorded, image data sub-set within the scan image data set;

(d) means for determining the information content of the camera recorded, image data sub-set;

(e) means responsive to the determined information content for developing a substitute image data sub-set for the camera recorded, image data sub-set;

(f) means for substituting the substitute image data sub-set for the camera recorded, image data sub-set within the scan image data set to thereby provide a reproduction image data set; and (g) means for reproducing a reproduction image from the reproduction image data set, wherein the camera recorded information comprises optically exposed, camera exposure data intended for use in controlling reproduction of the reproduction images made of the exposed image and wherein: means (d) further comprises:

(1) means for determining that the camera recorded image data sub-set constitutes camera exposure data; and (2) means for processing the scan image data set in accordance with the camera exposure data to provide an exposure and color balanced scan image data set.

36. Apparatus for making a reproduction image of a film image frame containing both an exposed image and camera recorded information exposed within the exposed image frame by operation of a camera comprising:

(a) means for scanning the film image frame to develop a scan image data set therefrom containing both exposed image and camera recorded information;

(b) means for searching for and recognizing characteristics of camera recorded information in the scan image data set (c) means responsive to the recognized characteristics for generating a camera recorded, image data sub-set within the scan image data set;

(d) means for determining the information content of the camera recorded, image data sub-set;

(e) means responsive to the determined information content for developing a substitute image data sub-set for the camera recorded, image data sub-set;

(f) means for substituting the substitute image data sub-set for the camera recorded, image data sub-set within the scan image data set to thereby provide a reproduction image data set; and (g) means for reproducing a reproduction image from the reproduction image data set, wherein the camera recorded information comprises optically exposed, alpha-numeric characters in text intended for reproduction in reproduction images made from the film image frame, and the method is operable in an enhanced font, image reproduction mode wherein means (d) further comprises:

(1) means for identifying a character bit-map of the camera recorded, image data sub-set; and (2) means for decoding the alpha-numeric characters from the character bit-map; and means (e) further comprises means for encoding the substitute image data sub-set with character bit-maps of enhanced font alpha-numeric characters corresponding to the decoded alpha-numeric characters having a selected, enhanced font color and appearance, whereby the alpha-numeric characters are reproduced within the reproduction image made from the reproduction image data set with an enhanced font appearance and color.

37. The apparatus of either claim 36 or 38 wherein:

means (g) further comprises means for recording said reproduction image in a Photo CD adapted to provide a video display image when played.

38. Apparatus for making a reproduction image of a film image frame containing both an exposed image and camera recorded information exposed within the exposed image frame by operation of a camera comprising:

(a) means for scanning the film image frame to develop a scan image data set therefrom containing both exposed image and camera recorded information;

(b) means for searching for and recognizing characteristics of camera recorded information in the scan image data set (c) means responsive to the recognized characteristics for generating a camera recorded, image data sub-set within the scan image data set;

(d) means for determining the information content of the camera recorded, image data sub-set;

(e) means responsive to the determined information content for developing a substitute image data sub-set for the camera recorded, image data sub-set;

(f) means for substituting the substitute image data sub-set for the camera recorded, image data sub-set within the scan image data set to thereby provide a reproduction image data set; and (g) means for reproducing a reproduction image from the reproduction image data set, wherein the camera recorded information comprises optically exposed, alpha-numeric characters in text intended for reproduction in reproduction images made from the film image frame, and the method is operable in an enhanced font, image reproduction mode, wherein means (d) further comprises:

(1) means for identifying a bit-map of said scan image data set encompassing at least the character bit-map of the camera recorded, image data sub-set and a surrounding border region; and (2) means for decoding the alpha-numeric characters from the character bit-map; and means (e) further comprises means for encoding the substitute image data sub-set with character bit-maps of enhanced font, alpha-numeric characters corresponding to the decoded alpha-numeric characters having a selected, enhanced font color and appearance and with an enhanced, contrasting color, border region spatially surrounding said enhanced font, alpha-numeric characters together forming said substitute image data sub-set, whereby the alpha-numeric characters are reproduced within the reproduction image made from the reproduction image data set with an enhanced font appearance and color surrounded by a contrasting color border.

39. The apparatus of either claim 36 or 38 wherein:

means (g) further comprises means for printing said reproduction image from the reproduction image data set as a print image on a surface of a print paper.

40. Apparatus for making a reproduction image of a film image frame containing both an exposed image and camera recorded information exposed within the exposed image frame by operation of a camera comprising:

(a) means for scanning the film image frame to develop a scan image data set therefrom containing both exposed image and camera recorded information;

(b) means for searching for and recognizing characteristics of camera recorded information in the scan image data set (c) means responsive to the recognized characteristics for generating a camera recorded, image data sub-set within the scan image data set;

(d) means for determining the information content of the camera recorded, image data sub-set;

(e) means responsive to the determined information content for developing a substitute image data sub-set for the camera recorded, image data sub-set;

(f) means for substituting the substitute image data sub-set for the camera recorded, image data sub-set within the scan image data set to thereby provide a reproduction image data set; and (g) means for reproducing a reproduction image from the reproduction image data set, wherein:

means (g) further comprises means for displaying said reproduction image data set as a video display image.

41. Apparatus for making a reproduction image of a film image frame containing both an exposed image and camera recorded information exposed within the exposed image frame by operation of a camera comprising:

(a) means for scanning the film image frame to develop a scan image data set therefrom containing both exposed image and camera recorded information;

(b) means for searching for and recognizing characteristics of camera recorded information in the scan image data set (c) means responsive to the recognized characteristics for generating a camera recorded, image data sub-set within the scan image data set;

(d) means for determining the information content of the camera recorded, image data sub-set;

(e) means responsive to the determined information content for developing a substitute image data sub-set for the camera recorded, image data sub-set;

(f) means for substituting the substitute image data sub-set for the camera recorded, image data sub-set within the scan image data set to thereby provide a reproduction image data set; and (g) means for reproducing a reproduction image from the reproduction image data set, wherein the camera recorded information comprises optically exposed, camera exposure data intended for use in controlling reproduction of the reproduction images made of the exposed image, and the apparatus is operable in a cropped image reproduction mode, wherein means(d) further comprises:

(1) means for identifying a character bit-map of the camera recorded, image data sub-set; and (2) means for determining that the camera recorded image data sub-set constitutes camera exposure data;

means (e) further comprises means for developing the substitute image data sub-set as a portion of said scan image encompassing at least the character bit-map to be masked from said reproduction image data set; and means (g) further comprises means for processing the scan image data set in accordance with the camera exposure data to provide an exposure and color balanced reproduction image data set, whereby said reproduction image data set comprises the scan image data set cropped in an area encompassing at least the character bit-map to develop the substitute image data sub-set.

42. The apparatus of claim 41 comprising:

(h) means for reproducing the camera exposure data in association with but outside the image area of the reproduction image.

* * * * *